(12) United States Patent
Gilstring

(10) Patent No.: US 9,693,499 B2
(45) Date of Patent: Jul. 4, 2017

(54) SEALING GASKET AND SEED HOUSING FOR A SEEDER AND SEEDER COMPRISING SUCH A SEED HOUSING

(71) Applicant: Vaderstad Holding AB, Vaderstad (SE)

(72) Inventor: Gert Gilstring, Skanninge (SE)

(73) Assignee: VÄDERSTAD HOLDING AB, Vaderstad (SE)

( * ) Notice: Subject to any disclaimer, the term of this patent is extended or adjusted under 35 U.S.C. 154(b) by 0 days.

(21) Appl. No.: 14/828,915

(22) Filed: Aug. 18, 2015

(65) Prior Publication Data

US 2015/0351316 A1    Dec. 10, 2015

Related U.S. Application Data

(63) Continuation of application No. 14/003,633, filed as application No. PCT/SE2012/050261 on Mar. 8, 2012, now Pat. No. 9,151,388.

(30) Foreign Application Priority Data

Mar. 9, 2011   (SE) .................................... 1150208

(51) Int. Cl.
*A01C 7/04*        (2006.01)
*A01C 7/20*        (2006.01)
(Continued)

(52) U.S. Cl.
CPC ................ *A01C 7/208* (2013.01); *A01C 7/04* (2013.01); *A01C 7/046* (2013.01); *F16J 15/06* (2013.01); *F16J 15/3232* (2013.01)

(58) Field of Classification Search
CPC .. A01C 7/04; A01C 7/00; A01C 7/046; A01C 7/044; A01C 7/042; A01C 7/208;
(Continued)

(56) References Cited

U.S. PATENT DOCUMENTS 3,888,387 A    6/1975 Deckler
4,047,638 A    9/1977 Harrer et al.
(Continued)

FOREIGN PATENT DOCUMENTS

DE    19510597      9/1996
DE    20203372 U1   6/2002
(Continued)

OTHER PUBLICATIONS

International Search Report Issued in May 11, 2012 in PCT/SE12/50261 filed Mar. 8, 2012.
(Continued)

*Primary Examiner* — Christopher J Novosad
(74) *Attorney, Agent, or Firm* — Oblon, McClelland, Maier & Neustadt, L.L.P.

(57) ABSTRACT

A sealing gasket made of a resilient rubber material or rubber-like material. The sealing gasket is formed as a rotationally symmetric body with a substantially constant cross-sectional profile. The cross-sectional profile includes: a first sealing part located furthest away from a center of rotation of the body and a second sealing part located radially inside the first sealing part, as viewed in the radial direction. An open space is defined by the first and second sealing parts. The second sealing part essentially curves through an angle away from the center of rotation. A seed housing can include such a seal and a seeder can include such a seed housing.

20 Claims, 5 Drawing Sheets

(51) Int. Cl.
*F16J 15/06* (2006.01)
*F16J 15/32* (2016.01)
*F16J 15/3232* (2016.01)

(58) Field of Classification Search
CPC ..... A01C 7/20; F16J 15/06; F16J 15/02; F16J 15/00; F16J 15/3232; F16J 15/3204; F16J 15/32; F16J 15/16
See application file for complete search history.

(56) References Cited

U.S. PATENT DOCUMENTS

| | | | |
|---|---|---|---|
| 4,143,884 A | 3/1979 | Nicholas et al. | |
| 4,836,412 A | 6/1989 | Webber et al. | |
| 5,178,364 A | 1/1993 | Garrigues et al. | |
| 5,401,035 A | 3/1995 | Schoenmackers | |
| 5,655,752 A | 8/1997 | De Villepoix et al. | |
| 6,024,364 A | 2/2000 | Steffen | |
| 6,516,733 B1 | 2/2003 | Sauder et al. | |
| 6,608,414 B1* | 8/2003 | Conley | H02K 5/225 277/602 |
| 6,748,885 B2 | 6/2004 | Sauder et al. | |
| 2007/0201782 A1 | 8/2007 | Miyagawa et al. | |

FOREIGN PATENT DOCUMENTS

| | | |
|---|---|---|
| EP | 0686792 | 6/1995 |
| SE | 533 547 C2 | 10/2010 |
| WO | WO 96/02123 | 2/1996 |

OTHER PUBLICATIONS

Extended Search Report issued Jun. 5, 2015 in European Patent Application No. 12755618.1.

* cited by examiner

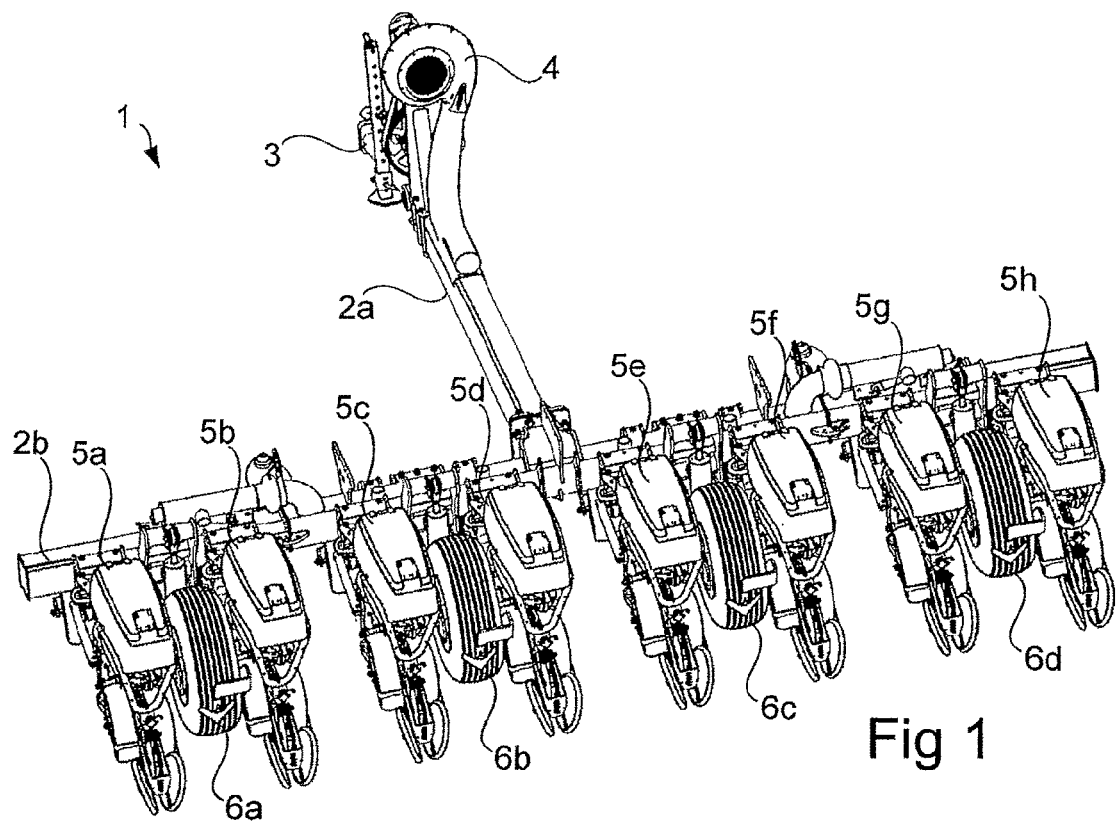
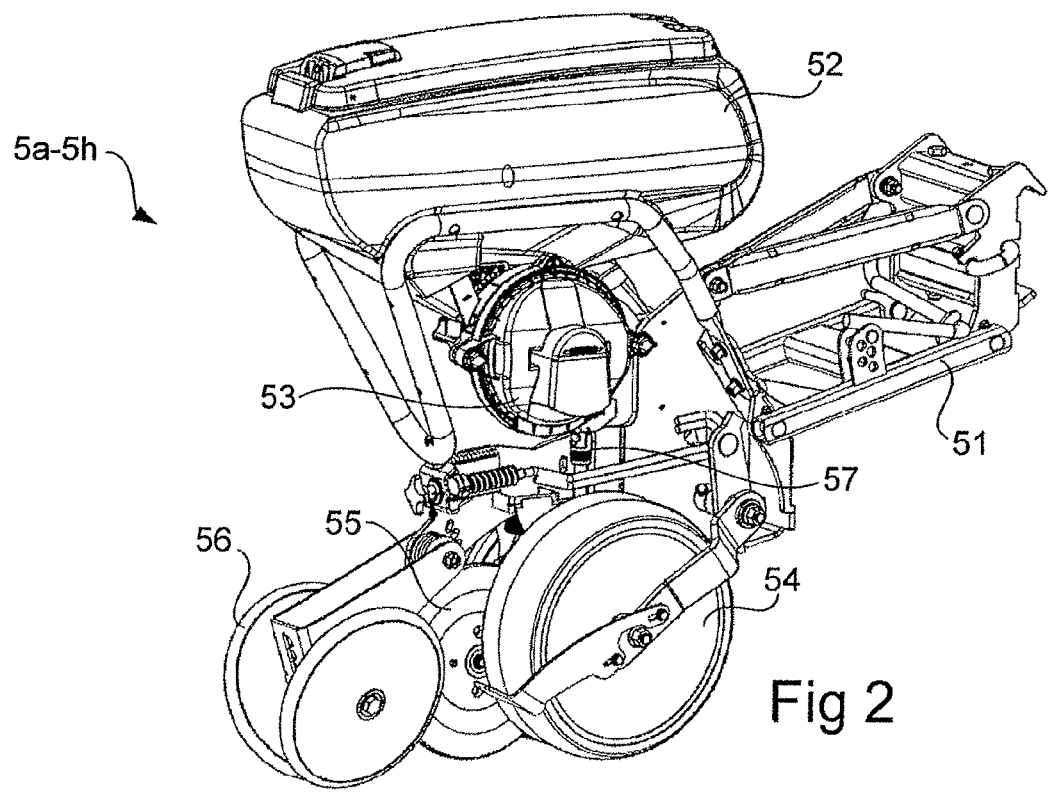
Fig 1
Fig 2

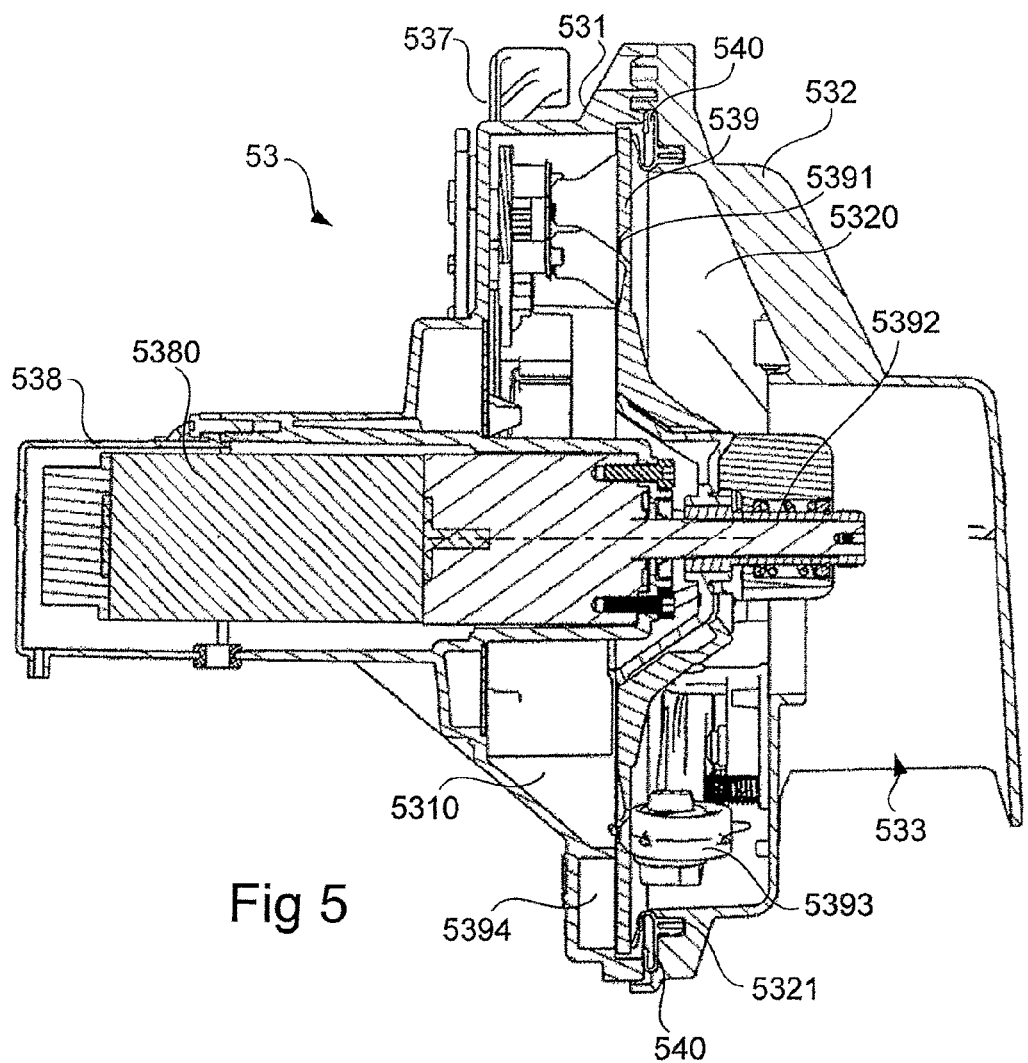
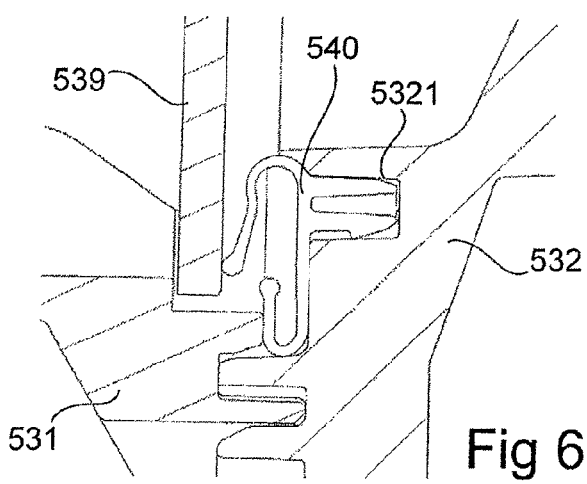

SEALING GASKET AND SEED HOUSING FOR A SEEDER AND SEEDER COMPRISING SUCH A SEED HOUSING

CROSS-REFERENCE TO RELATED APPLICATIONS

This application is a continuation of U.S. patent application Ser. No. 14/003,633 filed Oct. 22, 2013, which is a National Phase of PCT/SE2012/050261 filed Mar. 8, 2012, and claims priority to Swedish Patent Application No. 1150208-5 filed Mar. 9, 2011. The entire contents of each of which are incorporated herein by reference.

TECHNICAL FIELD

The present document relates to a sealing gasket for a seed housing of a seeder. The document further concerns a seed housing comprising such a sealing gasket and a seeder comprising such a seed housing.

The seed housing is particularly suited for sowing seeds to obtain a predetermined number of plants per unit of length, and more specifically for use in a precision seeder of the kind that utilizes an excess air pressure to feed seeds from the seed distributing device to a seed outlet.

BACKGROUND ART

When sowing crops such as maize, sunflowers and soya beans, it is desirable to plant, in each row, single seeds at a predetermined distance from each other. In order to achieve this, a so-called precision seeder, or "planter", can be used. A precision seeder can comprise a seed hopper, a seed distributing device, a seed feeding tube, a seed furrow opener, a seed knife, a press wheel and a seed furrow covering means.

An example of a seed distributing device for a precision seeder is disclosed in U.S. Pat. No. 4,047,638. This precision seeder has what is generally referred to as a singulating disc, i.e. a disc that rotates in a cavity where, on one side of the disc, there is an excess pressure and on the other there is a normal pressure. On the excess-pressure side, seeds are supplied from a seed hopper, so that the lower portion of the disc moves through a bulk quantity of seeds. By providing the disc with a number of perforations or holes, through which only air and not seeds is able to pass, the seeds will be "sucked" tight to the holes and lifted out of the bulk quantity of seeds. In another portion of the cavity, the hole can be temporarily obstructed on the normal-pressure side, thus causing the seed to fall by gravity from the disc and into a seed feeding tube through which it is conveyed to the seed knife.

It is desirable to position the singulating disc inside a seed housing so as to protect it from external damage.

To optimize the ability of the singulating disc to single out and retain seeds, it is desirable to establish a definite and stable pressure difference between the excess-pressure side of the singulating disc and its normal-pressure side, given an existing air flow and pressure.

To permit the use of one and the same seeder for several different types of crop, simple switching between different singulating discs is desirable, so that crop of different seed size can be sowed and/or seeds can be planted at different distances.

Thus, a number of challenges remain as regards the designing of a seed housing for a precision seeder.

SUMMARY OF THE INVENTION

An object of the present invention is to provide an improved design of a seed housing for an excess air pressure driven precision seeder.

A particular object is to provide a seed housing, in which the singulating disc is arranged so as to be well protected and yet is easily replaceable while ensuring a stable pressure difference between the excess-pressure side and the normal-pressure side.

The invention is defined by the appended independent claims. Embodiments of the invention will be apparent from the dependent claims and from the following description and the appended drawings.

According to a first aspect, there is provided a sealing gasket substantially made of a resilient rubber material or rubber-like material. The sealing gasket is formed as a rotationally symmetric body with a substantially constant cross-sectional profile, the cross-sectional profile having a first sealing part, located furthest away from a centre of rotation of the body, and a second sealing part, located radially inside said first sealing part, as viewed in the radial direction. An open space is defined by the first and second sealing parts. The second sealing part essentially curves through an angle away from the centre of rotation.

Thus, a sealing gasket is provided whose sealing capacity is improved when it is being subjected to an excess pressure in the inner space defined by the sealing parts.

The second sealing part can be in formed as a sealing lip with a free end, which preferably can have a portion of thicker material.

The portion of thicker material can contribute to reinforcing the gasket and preventing it from being unintentionally deformed.

The sealing gasket can have a base portion and the second sealing part, as viewed in the axial direction, can extend further away from the base portion than the first sealing part.

In this way, sealing between a surface and two surfaces located at different distances can be provided by one and the same sealing gasket.

The second sealing part can be joined to an end portion of the base portion by way of a rounded portion. The base portion can be substantially plane.

The space can have an opening and can taper towards the opening.

The first sealing part can essentially curve through an angle towards the centre of rotation.

The first sealing part can be formed as a sealing lip with a free end, which can have a portion of thicker material.

The first sealing part can be joined to an end portion of the base portion, preferably by way of a rounded portion.

A material thickness of at least part of the base portion and at least part of at least one of said sealing parts can be substantially constant.

The first sealing part can be in the form of a compressible seal.

The compressible seal can have a substantially closed and hollow portion.

Alternatively, the compressible seal can have at least one ridge, but also at least two ridges and an intermediate groove.

The second sealing part can have a wear protection, which can be formed integrally with the second sealing part.

The sealing gasket can further comprise an attachment portion, the sealing parts extending from a first side of the main plane and the attachment portion extending from a second side of the main plane.

The attachment portion can comprise at least two tongues, which extend from the base portion and which can, but need not, be separated by a groove.

At least one of the tongues can have a locking lug. As a result, its locking action can be improved.

According to a second aspect, there is provided a seed housing for a seeder, which seed housing is arranged to feed seeds by means of an excess air pressure. The seed housing has first and second seed housing parts, which are adapted to be joined together for forming the seed housing, a singulating disc, which is movably arranged in the seed housing, and a sealing gasket, which is adapted to provide a seal between the seed housing parts as well as between one of the seed housing parts and the singulating disc.

The sealing gasket can be a sealing gasket according to that which has been described above.

The first sealing part can be arranged to provide a seal between the seed housing parts and the second sealing part can be arranged to provide a seal between one of the seed housing parts and the singulating disc.

One of the seed housing parts can have a groove, in which the attachment portion of the sealing gasket is insertable.

The seed housing parts can include a fixedly mountable base unit and a lid that is removably attachable to the base unit, the sealing gasket being retainable in the lid.

The sealing gasket can be arranged on a normal-pressure side of the singulating disc.

According to a third aspect, there is provided a seeder comprising a seed housing according to that which has been described above.

According to a fourth aspect, use of a sealing gasket according to that which is described above is provided for sealing a seed housing of a seeder.

The sealing gasket can simultaneously seal between first and second parts of the seed housing and between a part of the seed housing and a singulating disc that is movable relative to the seed housing.

BRIEF DESCRIPTION OF THE DRAWINGS

FIG. 1 shows a precision seeder 1 as viewed obliquely from behind.

FIG. 2 shows a row unit 5a-5h of the precision seeder in FIG. 1.

FIG. 5 is a sectional view of the seed housing 53 in FIGS. 3 and 4.

FIG. 6 shows a detail of the sectional view of FIG. 5.

DESCRIPTION OF EMBODIMENTS

Figure 3:
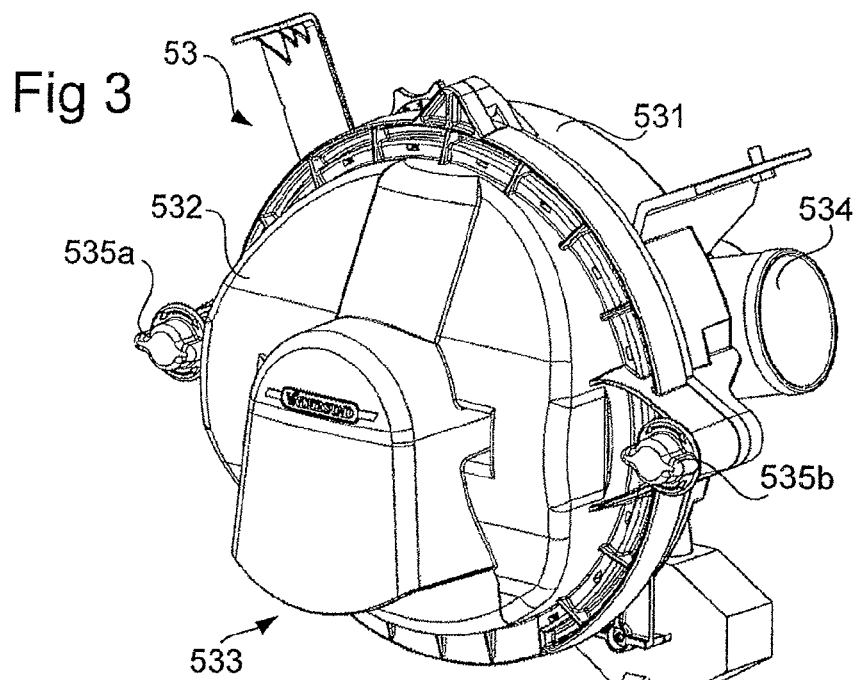
FIG. 3 shows a seed housing 53 of the row unit 5a-5h in FIG. 2, as viewed from the front.

FIG. 1 is a perspective view of a precision seeder 1, as viewed obliquely from behind. The seeder 1 comprises a frame with a longitudinal (as viewed in a direction of travel) beam 2a and a transverse beam 2b. At the front end of the longitudinal beam 2a there is a connecting device 3 for connecting the seeder to a towing vehicle, such as a tractor. In addition, there is a fan 4, which is arranged to supply, via a number of tubes, manifolds and hoses, compressed air to a plurality of row units 5a-5h. Along the transverse beam 2b there is also a plurality of support wheels 6a-6d. The function of the support wheels is to permit road transport as well as to support the frame during seeding.

Referring now to FIG. 2, each of the row units 5a-5h basically constitutes a separate seeder, to which compressed air and electricity are supplied, said seeder comprising a seeder frame structure 51, a seed hopper 52, a seed housing 53, a pair of depth-level controlling means 54, a press wheel 55 and a pair of seed furrow closing means 56. In addition, the seeder has a seed furrow opener, which can be in the form of a pair of mutually inclined discs, and a seed tube 57, which conveys the seeds from the seed housing 53 to a seed knife (not shown) or directly to an outlet (not shown) where the seeds are discharged into an opened seed furrow.

FIG. 3 shows the seed housing 53 as viewed from the front, which is the side from which the seed housing is accessible when mounted on a row unit 5a-5h. The seed housing 53 is formed by a front unit 531 and a back unit 532. The front unit 532 is removably attachable to the back unit 531 by the intermediary of fastening means 535a, 535b, which can be bayonet fittings, threaded joints, snap-in fittings or the like.

The seed housing further has an opening 533, through which the normal-pressure side of the singulating disc 539 (FIG. 5) communicates with the surrounding environment, and an air intake 534, through which the high-pressure side is connected to the fan 4.

Figure 4:
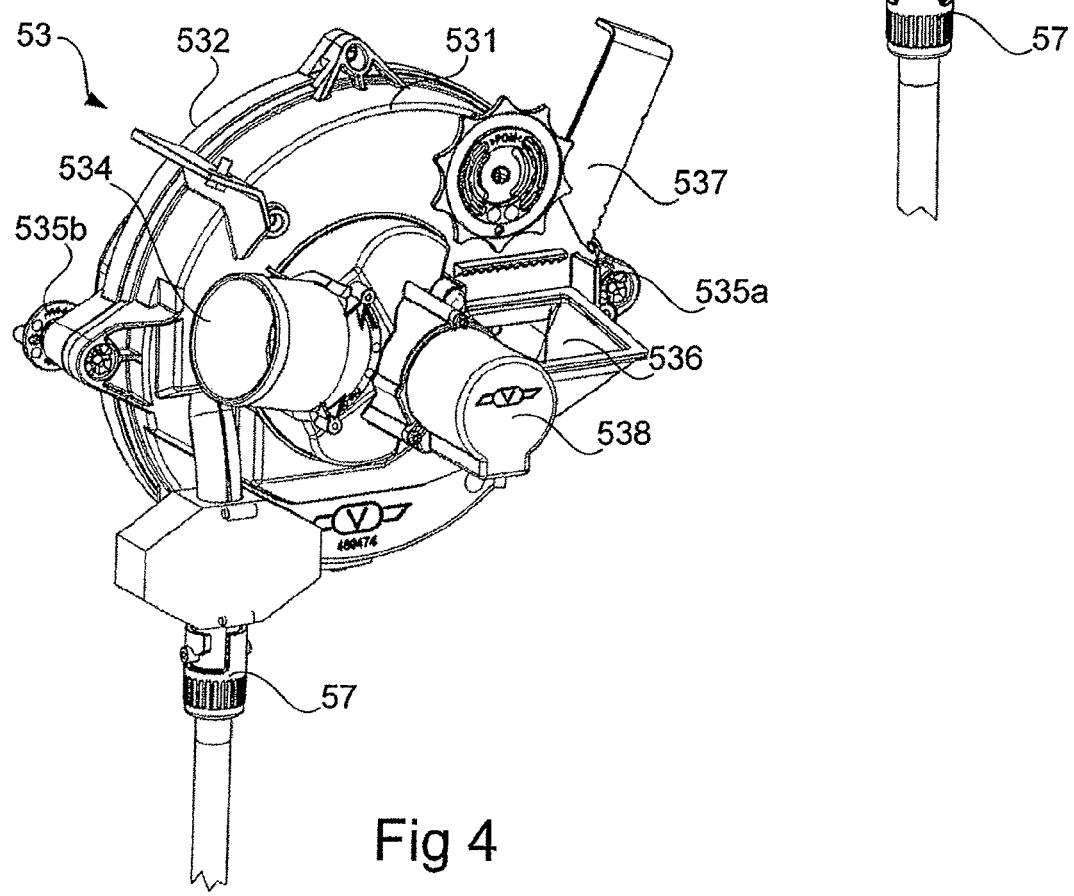
FIG. 4 shows the seed housing 53 in FIG. 3, as viewed from behind.

Referring to FIG. 4, the seed housing further has a seed inlet 536, through which seeds are fed from the seed hopper 52. A seed lever 537 can be arranged to control, by displacing it or rotating it, the flow area of the seed inlet 536 and, thus, the rate at which seeds are supplied from the seed hopper 53 to maintain a given level of seeds in the seed housing 53. The seed hopper can be arranged to feed seeds to the seed housing by gravity only, or by means of a feeding device, such as a scraper, a conveyor belt, a conveyor screw, an agitator or the like.

The seed tube 57 extends from the seed housing 53 and connects the seed housing to a seed knife (not shown) or a seed outlet (not shown).

FIG. 5 is a sectional view of the seed housing 53. A motor compartment 538 holds a seed housing driving mechanism 5380, which can be in the form of an electric motor, which can be connected to the singulating disc 539, such that the driving mechanism drives the singulating disc to rotate about a substantially horizontal axis through its centre.

The singulating disc 539 can be connected to the driving mechanism 5380 by way of a removable joint 5392, comprising for instance a bayonet fitting, a threaded joint or a snap-in fitting.

The singulating disc 539 forms a division between a high-pressure side 5310, which is supplied with pressurized air from the fan 4 via the air intake 534, and a normal-pressure side 5320, which communicates with the surrounding air via the opening 533.

The singulating disc 539 has a plurality of through holes 5391, which are each positioned at essentially the same radial distance from the centre of the singulating disc 539 and at essentially the same distance from each other. The holes 5391 can have a cross section that is tapering either towards the high-pressure side 5310 or towards the normal-pressure side 5320.

Furthermore, a seal 5393, which here is in the form of a rubber-covered wheel, can be arranged, at a certain position of rotation of the singulating disc 539, to block the normal-pressure side of one or more holes 5391, so as to cause a seed carried adjacent to the hole to be released from the singulating disc 539 and drop into a connecting means 5394 connecting to the seed tube 57.

A sealing gasket 540 is arranged in an axially open groove 5321, which runs along substantially the whole axial connecting portion of the front unit 532. The groove 5321 can have a substantially constant cross-section. In one embodiment, the groove 5321 has a plurality of protuberances or lugs, which extend inwardly into the groove and which ensure satisfactory attachment of the sealing gasket 540.

The sealing gasket 540 has a number of functions. A first function is to provide a seal between the back unit 531 and the front unit 532, so as to reduce air leakage from the high-pressure side 5310 through the joint between the back unit 531 and the front unit 532. A second function is to provide a seal between an axial surface of the singulating disc 539, close to its periphery, and the front unit 532, so as to reduce air leakage from the high-pressure side 5310 through the interspace between the singulating disc 539 and the front unit 532.

Figure 7:
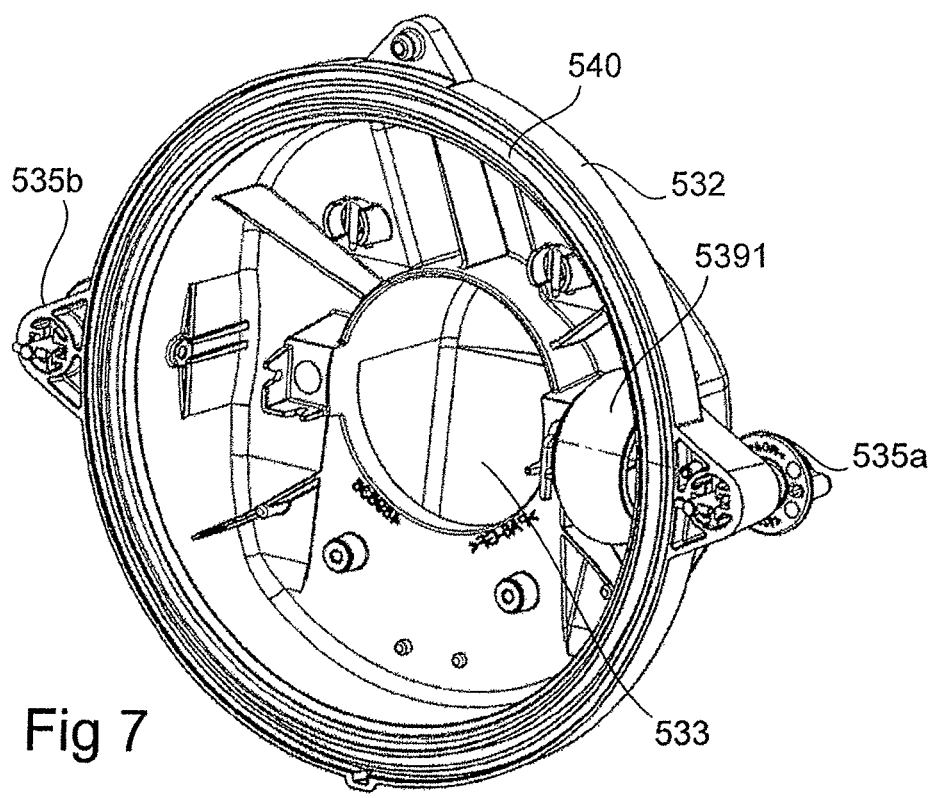
FIG. 7 shows the inside of a lid 532 for the seed housing of FIGS. 3-5.

FIG. 7 shows a perspective view of the inside of the front unit 532. Also visible are the fastening means 535*a*, 535*b* and the seal 5393 as well as the air outlet 533.

Figures 8A, 8B, 8C:
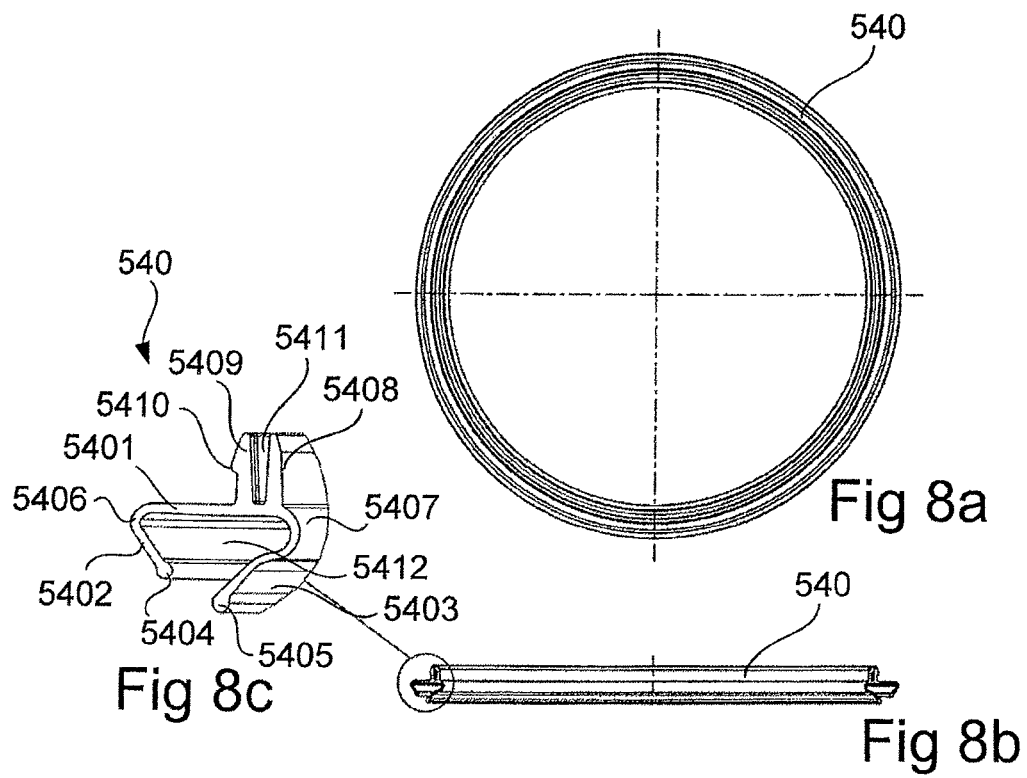
FIGS. 8a-8c show a sealing gasket 540 for the seed housing 53.

Referring now to FIGS. 8*a*-8*c*, the sealing gasket will be described in greater detail. It will be appreciated that FIGS. 8*a*-8*c* show the sealing gasket 540 in an unstressed (passive) state, and that FIG. 6 shows the sealing gasket 540 in a stressed (active) state.

The sealing gasket 540 consists of an elongate body having a substantially constant cross-section along its whole length. In one embodiment (FIG. 8*b*), the sealing gasket can have a substantially circular shape. It will be appreciated that the shape of the sealing gasket is suitably adapted to match the shape of the seed housing, or at least to match the shape of the front unit 532 of the seed housing 53.

The sealing gasket can be made of a resilient material, such as rubber or a rubber-like material, such as an elastomer (TPE, TPO, TPU). It is also conceivable for the sealing gasket to be made of another polymer material, provided that sufficiently good sealing capacity and strength can be achieved.

In one embodiment, the sealing gasket can be formed directly in its final mould through injection moulding, compression moulding or die-casting.

In another embodiment, the sealing gasket can be formed by shaping an elongate sealing strip of the desired profile into the desired structure and joining its ends together.

A further alternative is to form the sealing gasket as a two-component part, in which the part that makes contact with the seed disc is optimized to resist wear and reduce friction, which occur due to the relative movement between the seed disc and the seal. For example, this part can be made of a harder material than the rest of the sealing gasket.

Referring to FIG. 8*c*, the cross-sectional profile of the sealing gasket 540 can have a base portion 5401, which can be substantially plane and have a substantially constant material thickness. A first sealing lip 5402 can be joined to one end of the base portion 5401. In one embodiment, the first sealing lip 5402 is joined to the base portion 5401 via a curved portion 5406. This curved portion can, in unstressed state, form an angle of between 30 and 80 degrees to the base portion 5401.

The first sealing lip 5402 can have a free end 5404, which can be provided with a portion of thicker material.

The first sealing lip can have a length corresponding to approximately 20%-50% of the length of the base portion 5401, preferably approximately 30%-40% of the length of the base portion.

A second sealing lip 5403 can be joined to the other end of the base portion 5401. In one embodiment, the second sealing lip 5403 is joined to the base portion 5401 via a curved portion 5407. This curved portion can, in unstressed state, form an angle of between 30 and 80 degrees to the base portion 5401.

The second sealing lip 5402 can have a free end 5405, which can be provided with a portion of thicker material.

The second sealing lip can have a length that approximately corresponds to the length of the base portion 5401 less the length of the first sealing lip 5402.

It will be appreciated that the second sealing lip 5403 can have a length corresponding to approximately 50%-80% of the length of the base portion, preferably approximately 60%-70% of the length of the base portion.

It is not excluded that the sum of the lengths of the first and second sealing lips exceeds or is less than the length of the base portion. For example, the sum of the length of the sealing lips can be 10%-30% greater or smaller than the length of the base portion.

The sealing lips 5402, 5403 enclose, together with the base portion, a space 5412, which has an opening defined by the free ends 5404, 5405 of the sealing lips and which tapers towards said opening.

The base portion 5401 can be said to define a main plane for the sealing gasket 540. The sealing lips 5402, 5403 are located on a first side of this main plane, and an attachment portion 5408, 5409 is located on a second side of the main plane.

The attachment portion can be designed in a number of ways. In the embodiment shown, the attachment portion comprises a pair of tongues, which extend substantially at right angles to the main plane and, thus, to the base portion 5401. The tongues 5408, 5409 are separated by a groove 5411. It is conceivable, and possibly advantageous, to form bridges of material between the tongues 5408 and 5409 at regular intervals along the longitudinal direction of the sealing gasket 540 in order to improve the dimensional stability of the tongues.

One, or both, of the tongues 5408, 5409 can be provided with a locking lug 5410. The locking lug can be shaped to engage with corresponding lugs of the groove 5321, as described above.

According to different embodiments, the attachment portion 5408, 5409 can be shaped to engage with the groove 5321 in a formfitting manner 5321 only, by force only or through a combination thereof.

As shown in FIG. 8*c*, the attachment portion 5408, 5409 can be offset relative to any one of the ends of the base portion 5401. It can be offset either towards the end to which the first sealing lip 5402 is joined or towards the end to which the second sealing lip 5403 is joined (as shown in FIG. 8*c*). The offset distance can correspond to the whole distance to the end, or part of that distance (for example 40%-90%).

Since the functioning of the seed housing 53 has been previously described above, a further description thereof is deemed unnecessary.

And so the following description will focus on the functioning of the sealing gasket 540 in the seed housing 53.

As mentioned above, the sealing gasket 540 is fixedly attached in the axially open circular groove 5321 of the front unit 532. The fixation can occur by the sealing gasket being aligned with the groove and then inserted in the groove by means of an axially applied force.

Subsequently, the front unit 532 is fitted to the back unit by means of associated fitting elements, which, as in the present invention, can be in the form of associated axially open and cooperating grooves, the front unit being pressed against the back unit in such a manner that the first sealing lip 5402 enters into contact with a surface of the back unit 531 (see FIG. 6) and the second sealing lip 5403 enters into contact with an axial surface of the singulating disc 539. As a result, the free ends 5404, 5405 of the sealing lips 5402, 5403 will be bent inwardly towards the base portion 5401, thereby providing a sealing effect relatively to the back unit 531 and the singulating disc 539, respectively. This condition persists or is further enhanced by actuating the fastening means 535a, 535b in order to lock the front unit 532 to the back unit 531.

When air is supplied by the fan 4 to the high-pressure side 5310 of the singulating disc 539, some of the air will leak through the gap between the singulating disc and the back unit 531 (See FIG. 6). The air will leak through the opening defined by the free ends 5404, 5405 of the sealing lips and into the space 5412, pressurizing also this space. The pressurization of the space will cause the sealing lips 5402, 5403 to be forced outwards towards the back unit edge and the singulating disc 539, respectively, which will increase the contact pressure of the sealing lips and, thus, their sealing effect.

It will be appreciated that the sealing gasket 540, owing to the rotation of the singulating disc, will be subjected to wear. However, since the sealing gasket 540 is fixedly arranged in the front unit 532, it can be easily replaced, even under on-site conditions. In addition, the fact that the sealing gasket 540 is arranged on the front unit 532 reduces the risk of seeds entering the sealing gasket space 5412 when opening the seed housing, which would impair the functioning of the sealing gasket 540.

It will also be appreciated that the fact that the gasket is removed along with the front unit makes it easier to get rid of seeds that have penetrated into the space of the sealing gasket than if the gasket hade been attached to the back unit.

Figure 9A:
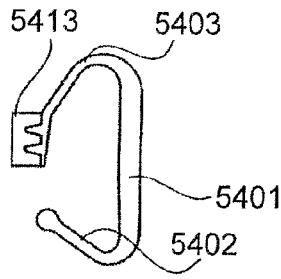
FIGS. 9a-9h show alternative embodiments of the sealing gasket 540.
Figure 9B:
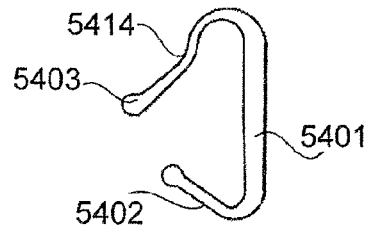
Figure 9C:
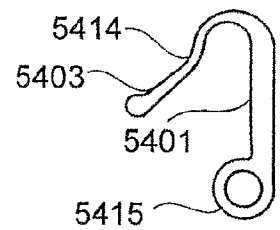

FIGS. 9a-9c show alternative sealing gaskets, which all lack an attachment portion. Instead, the base portion 5401 can be fastened by squeezing in a groove in the lid, and/or be provided with an adhesive means, such as tape that is adhesive on both sides.

FIG. 9a shows a sealing gasket which has a base portion 5401 and first and second sealing lips 5402, 5403, the second sealing lip being provided with a wear protection 5413. The wear protection can be made of plastic, rubber or a thermoplastic elastomer with a higher durability and/or lower friction than the material of which the rest of the sealing gasket is made. For example, the wear protection 5413 can be harder than the rest of the sealing gasket. As a result, the wear caused by the movement of the seed disc 539 relative to the sealing gasket 540 can be reduced and, thus, the service life of the sealing gasket prolonged. The wear protection and the sealing gasket can be formed by so-called two-component moulding of thermoplastics and thermoplastic elastomers.

FIG. 9b shows a sealing gasket where the second sealing lip 5403 has a concave portion 5414, as viewed from the outside, and thus corresponds to the sealing gasket shown in FIG. 6 and FIGS. 8a-8c.

FIG. 9c shows a sealing gasket where the first sealing lip has been replaced by a compressible seal 5425, which here is in the form of a hollow portion.

Figure 9D:
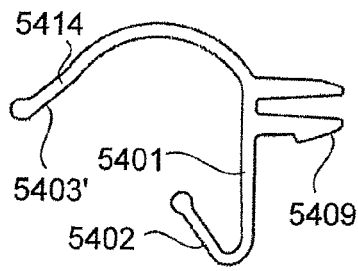

FIG. 9d shows a sealing gasket, the second sealing lip of which is drawn out to a considerable degree and extends more than twice (preferably about three times) the distance from the base portion 5401 as compared with the first sealing lip.

Figure 9E:
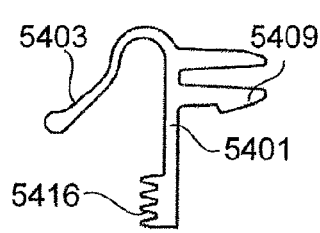

FIG. 9e shows a sealing gasket, whose first sealing lip has been replaced by a compressible seal 5416, which here is in the form of a "comb" having a plurality of ridges and grooves.

Figure 9F:
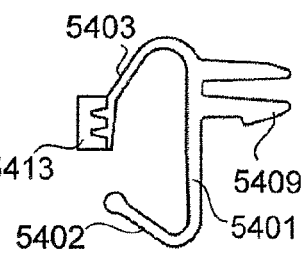

FIG. 9f shows an embodiment of the sealing gasket, which is identical to the one in FIG. 9a but provided with an attachment portion 5409.

Figure 9G:
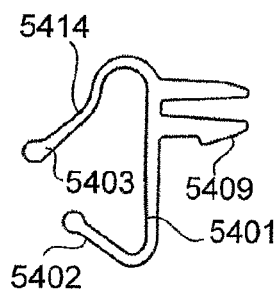

FIG. 9g shows an embodiment of the sealing gasket, which is identical to the one in FIG. 9b but provided with an attachment portion 5409.

Figure 9H:
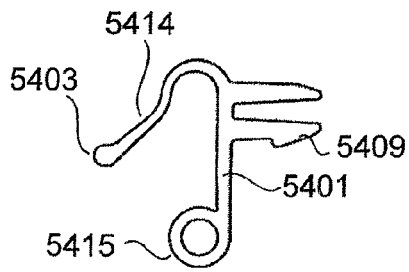

FIG. 9h shows an embodiment of the sealing gasket, which is identical to the one in FIG. 9c but provided with an attachment portion 5409.

Figure 10:
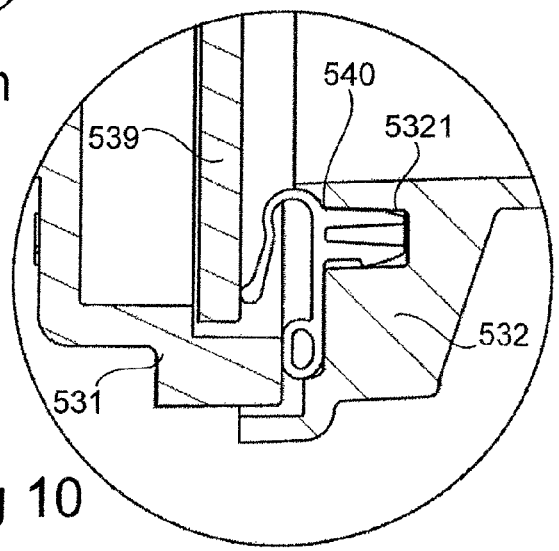
FIG. 10 shows a sealing gasket according to FIG. 9h when arranged in a seed housing.

FIG. 10 shows how a sealing gasket with a compressible seal according to FIG. 9h is arranged to seal a seed housing. The compressible seal 5415 here seals between the back unit 531 and the front unit 532 and the second lip 5403 seals between the seed disc 539 and the front unit 532.

The invention claimed is:

1. A seed housing for a seeder that discharges seeds using excess pressure, comprising:
    first and second seed housing parts configured to be joined together to form the seed housing,
    a singulating disc, which is movably arranged in the seed housing, and
    a sealing gasket comprising:
    a first sealing part configured to provide a seal between the first and second seed housing parts, by contacting both of said first and second seed housing parts, and
    a second sealing part configured to provide a seal between one of the first and second seed housing parts and the singulating disc, by contacting said seed housing part and said singulating disc.

2. The seed housing according to claim 1, wherein the sealing gasket includes a resilient elastic material,
    the sealing gasket being formed as a rotationally symmetric body with a constant cross-sectional profile, the cross-sectional profile including:
    the first sealing part located furthest away from a center of rotation of the rotationally symmetric body, and
    the second sealing part located radially inside said first sealing part, as viewed in a radial direction,
    an open space being defined by the first and second sealing parts,
    wherein the second sealing part curves through an angle away from the center of rotation.

3. The seed housing according to claim 2, wherein the first sealing part is configured to provide a seal between the first and second seed housing parts and the second sealing part is configured to provide a seal between one of the seed housing parts and the singulating disc.

4. The seed housing as claimed in claim 2, wherein the sealing gasket further comprises an attachment portion, wherein the first and second sealing parts extend from a first side of a main plane and the attachment portion extends from a second side of the main plane.

5. The seed housing according to claim 4, wherein one of the first and second seed housing parts has a groove, in which the attachment portion of the sealing gasket is insertable.

6. The seed housing according to claim 2, wherein the second sealing part is formed as a sealing lip with a free end having a portion of thicker material.

7. The seed housing according to claim 2, wherein the sealing gasket has a base portion and the second sealing part, as viewed in an axial direction, extends further away from the base portion than the first sealing part.

8. The seed housing according to claim 7, wherein the second sealing part is joined to an end portion of the base portion by a rounded portion.

9. The seed housing according to claim 7, wherein the first sealing part is joined to an end portion of the base portion by a rounded portion.

10. The seed housing according to claim 7, wherein a material thickness of at least part of the base portion and at least part of at least one of said sealing parts is constant.

11. The seed housing according to claim 7, wherein an attachment portion of the sealing gasket comprises at least two tongues, which extend from the base portion and which are separated by a groove.

12. The seed housing according to claim 2, wherein the open space has an opening and tapers towards the opening.

13. The seed housing according to claim 2, wherein the first sealing part curves through an angle towards the center of rotation.

14. The seed housing according to claim 2, wherein the first sealing part is formed as a sealing lip with a free end having a portion of thicker material.

15. The seed housing according to claim 2, wherein the first sealing part is a compressible seal.

16. The seed housing according to claim 15, wherein the compressible seal has a closed and hollow portion.

17. The seed housing according to claim 15, wherein the compressible seal has at least one ridge and an intermediate groove.

18. The seed housing according to claim 1, wherein the first and second seed housing parts include a fixedly mountable base unit and a lid that is removably attachable to the base unit, the sealing gasket being retainable in the lid.

19. The seed housing according to claim 1, wherein the sealing gasket is arranged on a lower-pressure side of the singulating disc, the lower-pressure side having a pressure that is less than a pressure of a high-pressure side of the singulating disc.

20. The seeder comprising a seed housing according to claim 1.

* * * * *